US012144084B2

(12) United States Patent
Lim et al.

(10) Patent No.: US 12,144,084 B2
(45) Date of Patent: Nov. 12, 2024

(54) ELECTRONIC DEVICE FOR DETECTING TEMPERATURE OF COOKING VESSEL HEATED BY INDUCTION COOKTOP AND METHOD OF OPERATING SAME

(71) Applicant: SAMSUNG ELECTRONICS CO., LTD., Suwon-si (KR)

(72) Inventors: Cheonyong Lim, Suwon-si (KR); Daehyun Kim, Suwon-si (KR); Sungbum Park, Suwon-si (KR); Youngho Ryu, Suwon-si (KR); Kyungwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 432 days.

(21) Appl. No.: 17/030,706

(22) Filed: Sep. 24, 2020

(65) Prior Publication Data

US 2021/0392722 A1 Dec. 16, 2021

(30) Foreign Application Priority Data

Jun. 12, 2020 (KR) ........................ 10-2020-0071776

(51) Int. Cl.
*H05B 6/06* (2006.01)
*H05B 6/12* (2006.01)

(52) U.S. Cl.
CPC ........... *H05B 6/062* (2013.01); *H05B 6/1236* (2013.01); *H05B 2213/06* (2013.01); *H05B 2213/07* (2013.01)

(58) Field of Classification Search
None
See application file for complete search history.

(56) References Cited

U.S. PATENT DOCUMENTS 8,240,914 B1 8/2012 Chapman et al.
10,090,886 B1 * 10/2018 Bell et al. ............... H02J 50/20 5/37

(Continued)

FOREIGN PATENT DOCUMENTS

DE 112014001914 T5 * 1/2016 ............. H05B 6/065
EP 2704523 A2 * 3/2014 ............. F24C 7/083

(Continued)

OTHER PUBLICATIONS

Machine translation of KR 200487054 Y1 performed on Aug. 31, 2022, Lee (Year: 2018).*

(Continued)

*Primary Examiner* — Dana Ross
*Assistant Examiner* — Kevin Guanhua Wen
(74) *Attorney, Agent, or Firm* — Nixon & Vanderhye P.C.

(57) ABSTRACT

According to various embodiments, an electronic device attachable to and detachable from a side of a cooking vessel that is heated based on a magnetic field generated from an induction cooktop includes: a magnetic harvester circuit configured to generate electric energy based on the magnetic field generated from the induction cooktop based on the electronic device being attached to the side of the cooking vessel; a temperature sensor configured to be driven based on the electric energy and configured to detect a temperature; and a communication circuit configured to transmit the temperature to the induction cooktop.

20 Claims, 7 Drawing Sheets

(56) References Cited

U.S. PATENT DOCUMENTS

| | | | | |
|---|---|---|---|---|
| 2010/0012645 A1 | | 1/2010 | Baier | |
| 2012/0000903 A1 | * | 1/2012 | Baarman et al. ........ | H05B 6/12 219/620 |
| 2014/0158701 A1 | | 6/2014 | Bonnel et al. | |
| 2017/0013681 A1 | * | 1/2017 | Lee et al. ................. | H05B 6/06 6/62 |
| 2019/0059132 A1 | | 2/2019 | Linglin | |
| 2020/0044482 A1 | * | 2/2020 | Partovi et al. .......... | H02J 50/10 50/10 |

FOREIGN PATENT DOCUMENTS

| | | | | |
|---|---|---|---|---|
| KR | 20-0391155 | | 8/2005 | |
| KR | 10-2016-0102463 | | 8/2016 | |
| KR | 10-2016-0127769 A | | 11/2016 | |
| KR | 20-2018-0001633 | | 6/2018 | |
| KR | 200487054 Y1 | * | 7/2018 | ........... H05B 1/0258 |
| KR | 10-2018-0136341 | | 12/2018 | |
| WO | WO 2015128578 A2 | * | 9/2015 | ............. H05B 6/062 |

OTHER PUBLICATIONS

Machine translation of WO 2015128578 A2 performed on Aug. 31, 2022, Ghechoua et al. (Year: 2015).*

Machine translation of DE 112014001914 T5 performed on Jan. 16, 2024, Kurose et al. (Year: 2016).*

Machine translation of EP 2704523 A2 performed on Jan. 16, 2024, Carretero et al. (Year: 2014).*

International Search Report and Written Opinion issued Aug. 5, 2021 in corresponding International Application No. PCT/KR2021/005324.

Korean Office Action dated Jun. 24, 2024 for KR Application No. 10-2020-0071776.

* cited by examiner

ELECTRONIC DEVICE FOR DETECTING TEMPERATURE OF COOKING VESSEL HEATED BY INDUCTION COOKTOP AND METHOD OF OPERATING SAME

CROSS-REFERENCE TO RELATED APPLICATION

This application is based on and claims priority under 35 U.S.C. § 119 to Korean Patent Application No. 10-2020-0071776, filed on Jun. 12, 2020, in the Korean Intellectual Property Office, the disclosure of which is incorporated by reference herein in its entirety.

BACKGROUND

Field

The disclosure relates to an electronic device for detecting a temperature of a cooking vessel heated by an induction cooktop, and a method of operating the same.

Description of Related Art

Induction cooktops capable of heating a cooking vessel using a magnetic field are widely used. The induction cooktop is provided with a coil, and can apply an electric current to the coil to generate a magnetic field around the coil, whereby a cooking vessel can be heated by an eddy current caused by a change in the magnetic field.

In the case where the cooking vessel is heated using a flame, a user can manually control heating power because the user can visually see the flame. In contrast, in the case where the cooking vessel is heated using an induction cooktop, the cooking vessel is heated by an electric current which is invisible to a user, and thus the user has difficulty properly controlling an intensity of the electric current. Therefore, to control the induction cooktop to apply a suitable electric current to the coil, electronic devices for detecting a temperature of the cooking vessel heated by the induction cooktop have come into wide use.

An electronic device for detecting a temperature of a cooking vessel heated by an induction cooktop may include a temperature sensor, and a battery that supplies power for driving the temperature sensor. However, because a temperature around the electronic device is frequently increased during cooking, there is a danger of explosion of the battery.

Further, the induction cooktop may include a plurality of coils on which a plurality of cooking vessels are respectively placed. In this case, when the induction cooktop receives the temperature detected from the electronic device, there is a need to check that the received temperature relates to the cooking vessel placed on any one of the plurality of coils.

SUMMARY

Embodiments of the disclosure provide an electronic device that may include a magnetic harvester circuit configured to generate electric energy based on a magnetic field generated from an induction cooktop. Embodiments of the disclosure further provide an electronic device that may transmit information about the electric energy generated by the magnetic harvester circuit to the induction cooktop.

According to various example embodiments, an electronic device that is attachable to and detachable from a side of a cooking vessel that is heated on the basis of a magnetic field generated from an induction cooktop includes: a magnetic harvester circuit configured to generate electric energy based on a magnetic field generated from the induction cooktop based on the electronic device being attached to a side of the cooking vessel; a temperature sensor configured to be driven based on the electric energy and configured to detect a temperature; and a communication circuit configured to transmit the detected temperature to the induction cooktop.

According to various example embodiments, an induction cooktop includes: a plurality of coils, a communication circuit, and a processor. The processor is configured to receive information indicating a temperature from an electronic device through the communication circuit, the electronic device being attachable to a side of a cooking vessel configured to be placed on the induction cooktop the induction cooktop configured to apply an electric current to at least one of the plurality of coils, the electronic device including a magnetic harvester circuit configured to produce electric energy based on a magnetic field generated based on the electric current applied to at least one of the plurality of coils, wherein the processor is configured to control the electric current based on the information indicating the temperature.

According to various example embodiments, a method of operating an electronic device attachable to and detachable from a side of a cooking vessel heated based on a magnetic field generated from an induction cooktop includes: producing electric energy based on the magnetic field generated from the induction cooktop based on the electronic device being attached to the side of the cooking vessel; driving a temperature sensor configured to detect a temperature based on the electric energy; and transmitting the temperature to the induction cooktop.

According to various example embodiments, an electronic device attachable to and detachable from a side of a cooking vessel heated based on a magnetic field generated from an induction cooktop includes: a magnetic harvester circuit configured to generate electric energy based on the magnetic field generated from the induction cooktop. Because the electronic device is not provided with a battery, a danger of explosion of the battery can be avoided.

According to various example embodiments, an electronic device attachable to and detachable from a side of a cooking vessel heated based on a magnetic field generated from an induction cooktop can transmit information about electric energy generated by a magnetic harvester circuit to the induction cooktop. The induction cooktop can check that a temperature received based on the information about the generated electric energy relates to the cooking vessel placed above any of a plurality of coils.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1A:
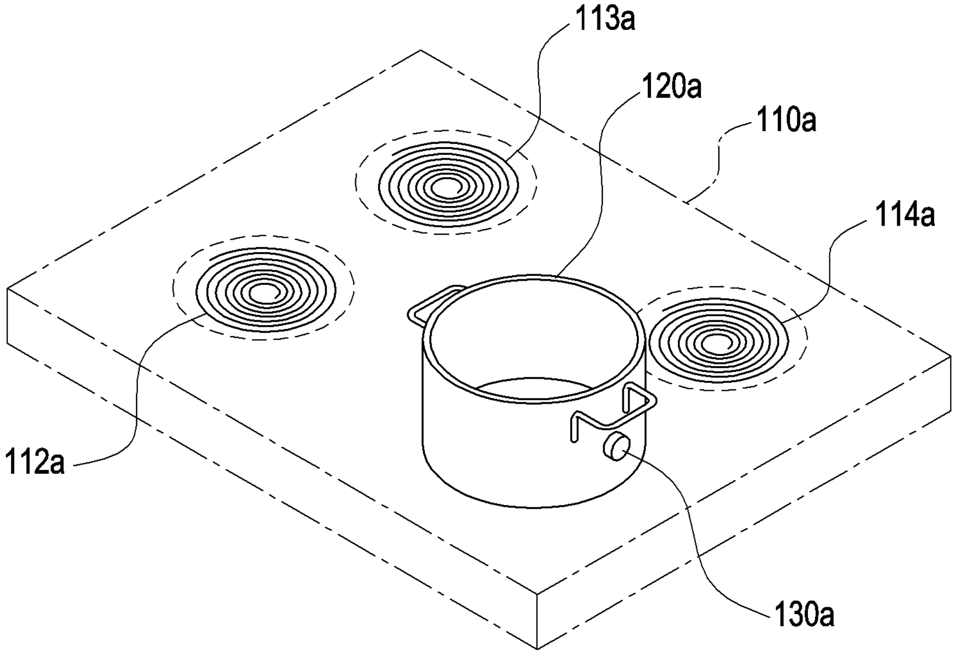
FIG. 1A is a diagram illustrating an example environment in which an electronic device is used according to various embodiments.
Figure 1B:
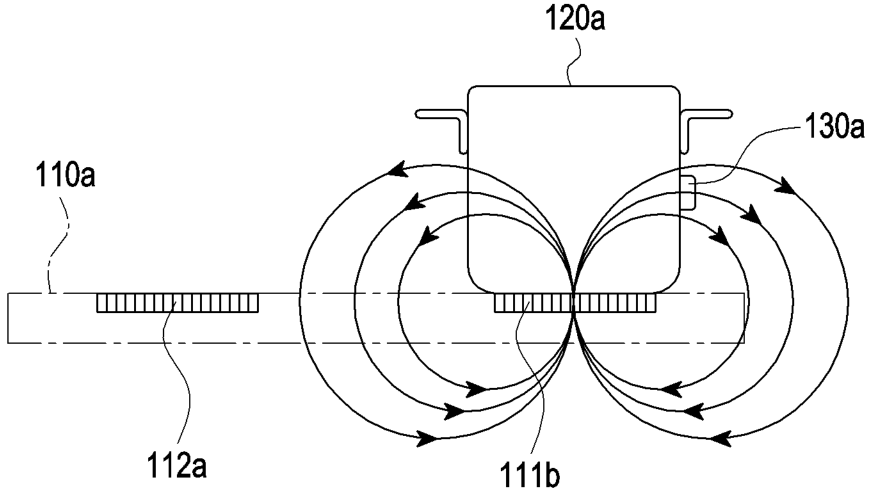
FIG. 1B is a diagram illustrating an example environment in which an electronic device is used according to various embodiments.

FIGS. 1A and 1B are diagrams illustrating an example environment in which an electronic device 130*a* is used according to various embodiments.

Referring to FIG. 1A, an electronic device 130*a* according to an embodiment of the disclosure may be configured to be attachable to and detachable from a side of a cooking vessel 120*a* that is heated by a magnetic field generated from an induction cooktop 110*a*. The induction cooktop 110*a* may include a plurality of coils 112*a*, 113*a*, and 114*a* corresponding to positions at which cooking vessels can be placed. In FIG. 1A, the plurality of coils 112*a*, 113*a*, and 114*a* may be located under a surface of the induction cooktop 110*a* on which the cooking vessel 120*a* can be placed without being located on the surface of the induction cooktop 110*a*. For example, with reference to FIG. 1B, when the cooking vessel 120*a* is placed on the induction cooktop 110*a*, the cooking vessel 120*a* may not come into contact with a coil 111*b*. An example of the induction cooktop 110*a* that includes a total of four coils, inclusive of the three coils 112*a*, 113*a*, and 114*a* and the coil 111*b* corresponding to a position of the cooking vessel 120*a*, is illustrated in FIG. 1A. An electronic device 130*a* according to an embodiment of the disclosure may be used in an environment in which there is an induction cooktop 110*a* including a predetermined number of coils.

The cooking vessel 120*a* according to an embodiment of the disclosure may be located at a position on the surface of the induction cooktop 110*a* corresponding to a position of the coil 111*b*. The cooking vessel 120*a* may include a vessel that contains food while the food is heated. The cooking vessel 120*a* may include, for example, and without limitation, a pot, a pan, a wok, a skillet, a kettle, or the like. The cooking vessel 120*a* may include a magnetic material that can be heated by the induction cooktop 110*a*.

The induction cooktop 110*a* according to an embodiment of the disclosure may apply an electric current whose intensity varies with time to the coil 111*b*. An example of a magnetic field (e.g., flux) that is formed around the coil 111*b* at a specific point in time as the electric current is applied to the coil 111*b* is illustrated in FIG. 1B. As the electric current applied to the coil 111*b* varies, the magnetic field formed around the coil 111*b* may also be changed. An eddy current caused by a change in the magnetic field may flow to a surface of the cooking vessel 120*a* that is in contact with the induction cooktop 110*a*, and the cooking vessel 120*a* may be heated by the eddy current.

The electronic device 130*a* according to an embodiment of the disclosure may be configured to be attachable to and detachable from the side of the cooking vessel 120*a*. According to an embodiment, a magnet may be located inside the electronic device 130*a* at one side of the electronic device 130*a* that is attachable to and detachable from the side of the cooking vessel 120*a*. According to another embodiment, the electronic device 130*a* may include a magnet located on one side of the electronic device 130*a* that is attachable to and detachable from the side of the cooking vessel 120*a*, and the magnet may be exposed to the outside of the electronic device 130*a*. At least a part of the side of the cooking vessel 120*a* may be formed of a magnetic material, and the electronic device 130*a* may be attached to at least a part of the side of the cooking vessel 120*a* which is formed of a magnetic material due to a magnetic force of the magnet.

Figure 1C:
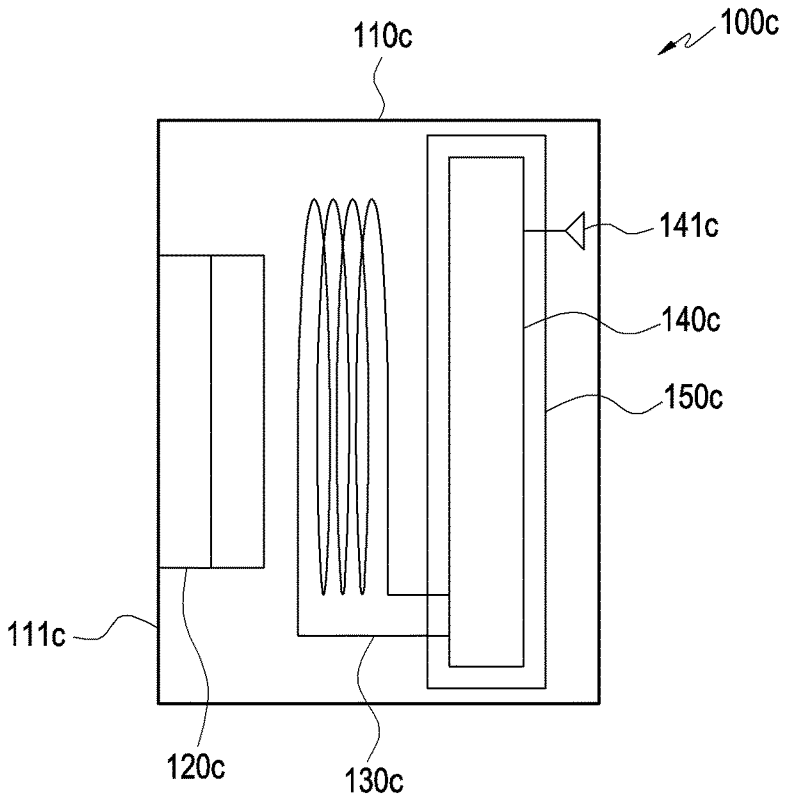
FIG. 1C is a diagram illustrating an example structure of an electronic device according to various embodiments.

FIG. 1C is an diagram illustrating an example electronic device 100*c* according to an embodiment. According to an embodiment, an electronic device 100*c* of FIG. 1C may be a non-limiting example of the electronic device 130*a* of FIGS. 1A and 1B.

According to an embodiment, the electronic device 100*c* may include a housing 110*c*, a magnet 120*c*, a coil 130*c*, an internal circuit 140*c*, and a shield 150*c*.

The housing 110*c* may be formed of a material that transmits a magnetic field generated by the magnet 120*c*.

The magnet 120*c* may be disposed adjacent to a surface 111*c* of surfaces of the housing 110*c* which is attached to the cooking vessel. According to an embodiment, the magnet 120*c* may be disposed inside the housing 110*c* at a fixed distance from the surface 111*c* attached to the cooking vessel. At least a part of the side of the cooking vessel may be formed of a magnetic material, and the electronic device 100*c* may be attached to the side of the cooking vessel by a magnetic force that acts between the magnet 120*c* and the magnetic material of the side of the cooking vessel.

The coil 130*c* may generate electric energy (e.g., an induced electromotive force) based on a magnetic field formed around the coil in the induction cooktop in order to heat the cooking vessel. According to an embodiment, a magnitude of the induced electromotive force generated at opposite ends of the coil 130*c* may be proportional to a variation of magnetic flux passing a cross section of the coil 130*c* over time. According to an embodiment, the magnitude of the induced electromotive force generated at the opposite ends of the coil 130*c* may be proportional to the number of turns of the coil 130*c*.

An example in which the cross section of the coil 130*c* is disposed parallel to the surface 111*c* attached to the cooking vessel is illustrated in FIG. 1C. However, according to an embodiment, the coil 130*c* may be disposed at a different angle. For example, the coil 130*c* may be disposed such that a normal line of the cross section of the coil 130*c* is parallel to a height direction of the cooking vessel.

According to an embodiment, the electric energy generated by the coil 130*c* may be transmitted to the internal circuit 140*c*. According to an embodiment, the internal circuit 140*c* may include, for example, and without limitation, a rectifier circuit for converting AC power into DC power, a DC/DC converter (or, a regulator) for converting the DC power into DC power having a specific voltage value, a temperature sensor for detecting a temperature, and a communication circuit for transmitting the detected temperature to the induction cooktop. According to various embodiments, the internal circuit 140*c* may further include at least one processor configured to control the temperature sensor and to communication circuit based on the temperature detected by the temperature sensor.

According to an embodiment, at least one of the DC/DC converter, the temperature sensor, and the communication circuit may be driven using the electric energy generated by the coil 130*c* as an energy source. According to an embodiment, the temperature sensor and the communication circuit may be driven using a DC voltage that is output from the DC/DC converter using the electric energy generated by the coil 130*c* as the energy source. According to implementation, the DC/DC converter may be omitted. Because the temperature sensor and the communication circuit may be driven using the electric energy generated by the coil 130*c* as the energy source, the electronic device 100*c* may detect a temperature without a separate power supply such as a battery, and transmit the detected temperature to the induction cooktop. The induction cooktop that receives the temperature from the electronic device 100*c* may control an amount of the electric current applied to the coil in order to heat the cooking vessel based on the received temperature. Therefore, a temperature suitable for cooking can be maintained.

According to an embodiment, the communication circuit of the internal circuit 140*c* may include an antenna 141*c* for performing communication with the induction cooktop. In FIG. 1C, the internal circuit 140*c* and the antenna 141*c* are illustrated as separate configurations, which is to represent a difference in a position relative to the shield 150*c*. However, it will be understood that the disclosure is not limited to this illustrated arrangement.

The shield 150*c* may prevent and/or reduce an amount of the magnetic field caused by the electric current applied to the coil of the induction cooktop and the magnetic field of the magnet 120*c* from reaching the internal circuit 140*c*. According to an embodiment, the shield 150*c* may have a shape surrounding the internal circuit 140*c*. In this case, the antenna 141*c* of the internal circuit 140*c* may be disposed outside the shield 150*c*.

Figure 2:
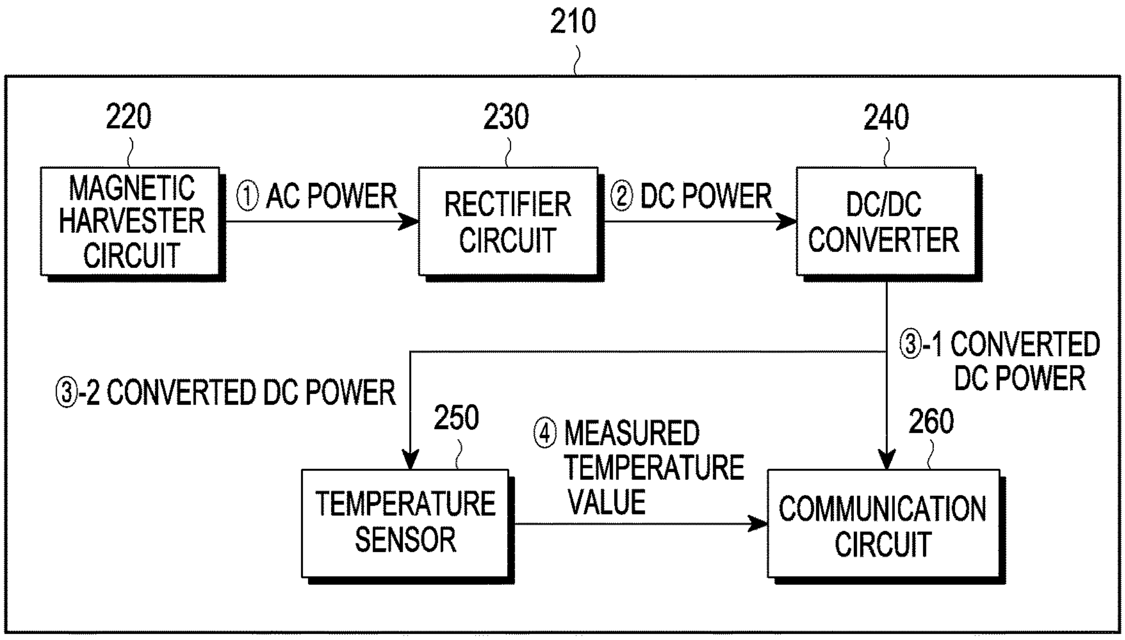
FIG. 2 is a block diagram illustrating an example electronic device according to various embodiments.

FIG. 2 is a block diagram illustrating an example electronic device 210 according to an embodiment. According to an embodiment, an electronic device 210 may be the electronic device 130*a* of FIGS. 1A and 1B. According to an embodiment, the electronic device 210 may be the electronic device 100*c* of FIG. 1C.

Referring to FIG. 2, the electronic device 210 may include a magnetic harvester circuit 220, a rectifier circuit 230, a DC/DC converter 240, a temperature sensor 250, and a communication circuit 260.

The magnetic harvester circuit 220 may generate electric energy based on the magnetic field formed around the coil in the induction cooktop in order to heat the cooking vessel. The magnetic harvester circuit 220 may include a coil (e.g., the coil 130*c* of FIG. 1C). An AC current may be applied to the coil in the induction cooktop. Accordingly, the magnetic field formed around the coil in the induction cooktop may vary over time, and magnetic flux passing a cross section of the coil included in the magnetic harvester circuit 220 of the electronic device 210 attached to the side of the cooking vessel heated based on the magnetic field formed around the coil in the induction cooktop may also vary over time. Therefore, AC power may be induced at opposite ends of the coil included in the magnetic harvester circuit 220. A magnitude of an induced electromotive force generated at the opposite ends of the coil included in the magnetic harvester circuit 220 may be proportional to a variation of the magnetic flux passing a cross section of the coil included in the magnetic harvester circuit 220 over time, and be proportional to the number of turns of the coil included in the magnetic harvester circuit 220. The AC power generated from the magnetic harvester circuit 220 may be transmitted to the rectifier circuit 230 (① of FIG. 2).

The rectifier circuit 230 may convert the AC power generated from the magnetic harvester circuit 220 into DC power, and output the DC power to the DC/DC converter 240 (② of FIG. 2).

The DC/DC converter 240 may convert the DC power output from the rectifier circuit 230 into DC power having a specific voltage value. According to an embodiment, the DC/DC converter 240 may convert the DC power output from the rectifier circuit 230 into DC power having a voltage value suitable to drive the temperature sensor 250 and the communication circuit 260. The DC power converted by the DC/DC converter 240 may be transmitted to the communication circuit 260 (③-1 of FIG. 2). The DC power converted by the DC/DC converter 240 may be transmitted to the temperature sensor 250 (③-2 of FIG. 2).

The above description with reference to FIG. 2 is based on an assumption that a voltage value suitable to drive the temperature sensor 250 and the communication circuit 260 exists. However, according to an embodiment, a voltage value suitable to drive both the temperature sensor 250 and the communication circuit 260 may not exist. In this case, unlike the example illustrated in FIG. 2, the electronic device 210 may include two DC/DC converters 240, and the two DC/DC converters 240 may convert DC power output from the rectifier circuit 230 into DC power having a voltage value suitable to drive the temperature sensor 250, and into DC power having a voltage value suitable to drive the communication circuit 260.

The temperature sensor 250 may be driven using the DC power transmitted from the DC/DC converter 240, and detect a temperature. The temperature sensor 250 may transmit an electric signal indicating the detected temperature to the communication circuit 260, thereby transmitting a measured temperature value to the communication circuit 260 (④ of FIG. 2).

The communication circuit 260 may transmit a signal indicating the measured temperature value to the induction cooktop based on the measured temperature value (④ of FIG. 2) received from the temperature sensor 250. According to an embodiment, the communication circuit 260 may support, for example, and without limitation, BLE communication, or the like. The communication circuit 260 may transmit a signal indicating the detected temperature to the induction cooktop. According to another embodiment, the communication circuit 260 may communicate with an external electronic device in addition to the induction cooktop. For example, the external electronic device may be a portable communication device (e.g., a smart phone). According to an embodiment, an application for controlling the induction cooktop and the electronic device 210 may be installed on the external electronic device.

The induction cooktop may control an amount of the electric current applied to the coil corresponding to the cooking vessel to which the electronic device 210 is attached based on the temperature received from the electronic device 210. Therefore, the induction cooktop may make it possible for the cooking vessel to which the electronic device 210 is attached to maintain a temperature suitable for cooking based on feedback from the electronic device 210.

Although not illustrated in FIG. 2, according to an embodiment, the electronic device 210 may further include at least one processor (e.g., including processing circuitry). The at least one processor may include various processing circuitry and control the temperature sensor 250 and the communication circuit 260. For example, the at least one processor may control the temperature sensor 250 to detect a temperature, receive an electric signal corresponding to a measured temperature value from the temperature sensor 250, and control the communication circuit 260 to transmit a signal to the induction cooktop based on the electric signal received from the temperature sensor 250. The at least one processor may control the communication circuit 260 to transmit the signal indicating the measured temperature value from the temperature sensor 250 to the induction cooktop, or derive a value represented by the signal to be transmitted to the induction cooktop through fixed calculation for the measured temperature value. The at least one processor may be driven based on the electric energy generated by the magnetic harvester circuit 220 like the temperature sensor 250 and the communication circuit 260.

Although not illustrated in FIG. 2, according to an embodiment, the electronic device 210 may further include an output device (e.g., including circuitry). The output device may include, for example, and without limitation, at least one of a display unit, a speaker, or the like. According to various embodiments, the at least one processor of the electronic device 210 may control the display unit to display different colors based on the temperature detected through the temperature sensor 250. According to various embodiments, the at least one processor of the electronic device 210 may control the speaker to output a sound based on the temperature detected through the temperature sensor 250.

Figure 3:
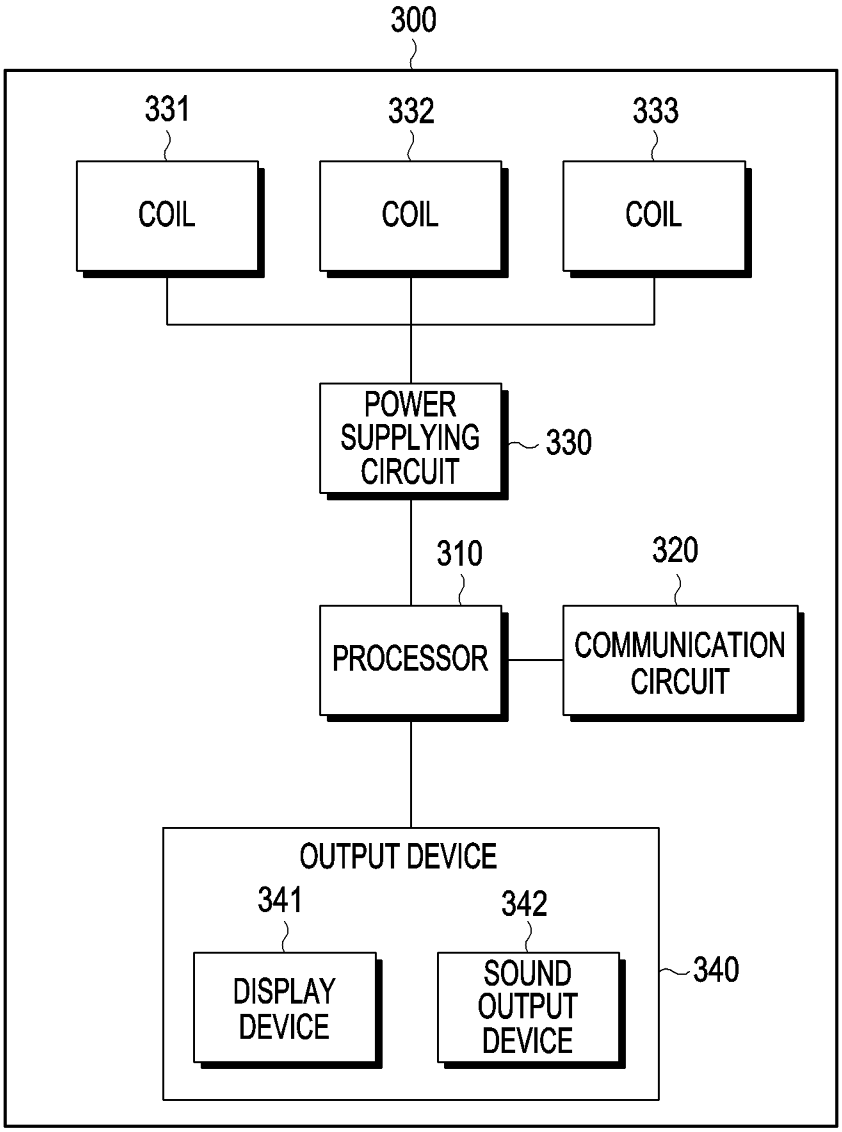
FIG. 3 is a block diagram illustrating an example induction cooktop according to various embodiments.

FIG. 3 is a block diagram illustrating an example induction cooktop 300 according to various embodiments. An induction cooktop 300 may include a plurality of coils 331, 332, and 333, a power supplying circuit 330, a processor (e.g., including processing circuitry) 310, a communication circuit 320, and an output device (e.g., including output circuitry) 340. An example in which the induction cooktop 300 includes three coils 331, 332, and 333 is illustrated in FIG. 3. However, according to various embodiments, the number of the coils included in the induction cooktop 300 is not limited.

According to various embodiments, the induction cooktop 300 may include the power supplying circuit 330 configured to apply an electric current to the plurality of coils 331, 332, and 333. The power supplying circuit 330 may be controlled by the processor 310, and the processor 310 may control the power supplying circuit 330 to apply the electric current to at least one of the plurality of coils 331, 332, and 333 based on an output level set by a user.

According to various embodiments, the processor 310 may include various processing circuitry and transmit an electric signal to another element of the induction cooktop 300, or receive an electric signal from another element. The processor 310 may perform a given operation through another element of the induction cooktop 300, which may refer, for example, to transmitting an electric signal for obtaining a result of performing the operation to the other element, or receiving an electric signal generated by the result of performing the operation from the other element.

According to various embodiments, the communication circuit 320 may perform various types of communication with different entities. According to various embodiments, the communication circuit 320 may receive the signal indicating the measured temperature value from the electronic device 210 illustrated in FIG. 2. According to various embodiments, the communication circuit 320 may receive a signal for controlling output levels of the plurality of coils 331, 332, and 333 from an external electronic device other than the electronic device 210 illustrated in FIG. 2.

According to various embodiments, the output device 340 may include various output circuitry including, for example, and without limitation, a display device 341 and a sound output device 342, etc. The display device 341 may visually provide information to an outside (e.g., a user) of the induction cooktop 300. The sound output device 342 may output a sound based on an electric signal. The sound output device 342 may be, for instance, a speaker.

According to various embodiments, the processor 310 may control the communication circuit 320 to receive the signal indicating the measured temperature value from the electronic device 210 illustrated in FIG. 2, and control the output device 340 based on the signal. For example, the processor 310 may, for example, control the display device 341 such that a temperature represented by the signal received through the communication circuit 320 is displayed by a number, or to display a color corresponding to the temperature. In another example, in the case where the temperature represented by the signal received through the communication circuit 320 exceeds a specific temperature, the processor 310 may control the sound output device 342 to output a warning sound.

Although not illustrated in FIG. 3, according to various embodiments, the induction cooktop 300 may further include an input unit including circuitry for receiving commands or data from an outside (e.g., a user) of the induction cooktop 300. For example, the input unit may include at least one of a keyboard for inputting a specific temperature, and a button or touch input unit for setting an output level.

Figure 4A:
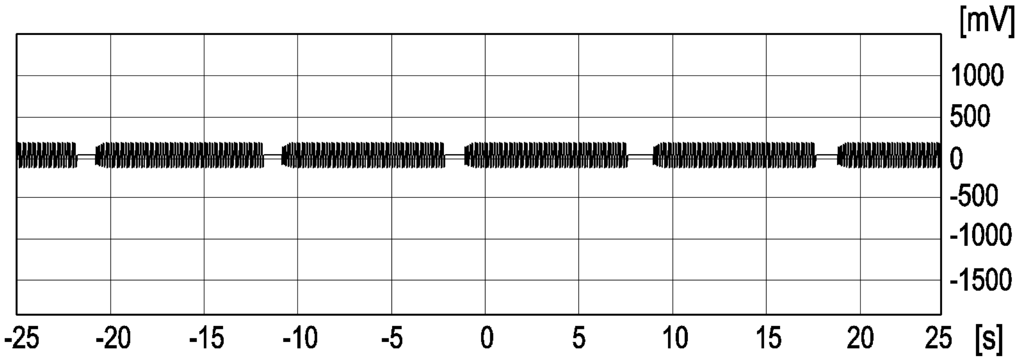
FIG. 4A is a diagram illustrating an example waveform corresponding to electric energy generated from the electronic device according to various embodiments.
Figure 4B:
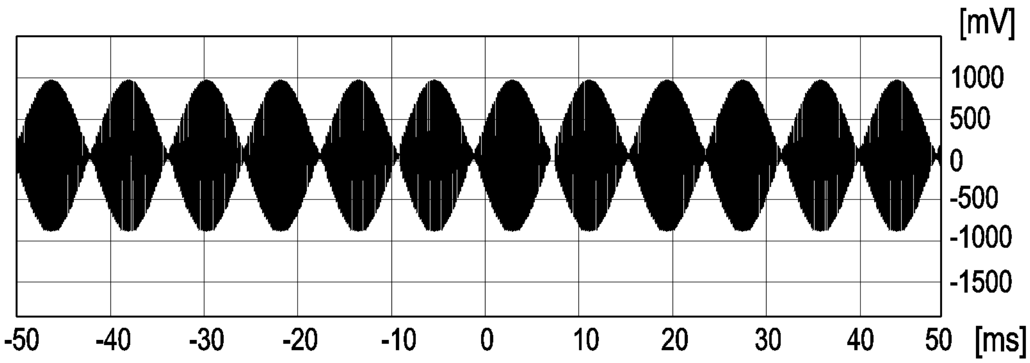
FIG. 4B is a diagram illustrating an example waveform corresponding to electric energy generated from the electronic device according to various embodiments.

FIGS. 4A and 4B are diagrams illustrating example waveforms corresponding to electric energy generated by the electronic device (e.g., the electronic device 210) according to various embodiments. FIG. 4A illustrates a voltage output from the magnetic harvester circuit when an output level of the induction cooktop is a fourth level using the magnetic harvester circuit including the coil.

Referring to FIG. 4A, an RMS value of a voltage output from the magnetic harvester circuit is 66 mV, and average power is 0.015 mW. FIG. 4B illustrates a voltage output from the magnetic harvester circuit when the output level of the induction cooktop is a sixth level higher than the fourth level using the same magnetic harvester circuit as the magnetic harvester circuit used in FIG. 4A. Referring to FIG. 4B, an RMS value of a voltage output from the magnetic harvester circuit is 450 mV, and average power is 0.068 mW. Values of power that is measured using the magnetic harvester circuit and the induction cooktop used in a simulation test of FIGS. 4A and 4B and is obtained according to an output level may be as follows in Table 1.

TABLE 1

| | Output level | | | | | | | | | |
|---|---|---|---|---|---|---|---|---|---|---|
| | 1 | 2 | 3 | 4 | 5 | 6 | 7 | 8 | 9 | 10 |
| Obtained power [mW] | 0.004 | 0.007 | 0.010 | 0.015 | 0.018 | 0.68 | 0.74 | 0.96 | 1.1 | 1.4 |

Figure 5:
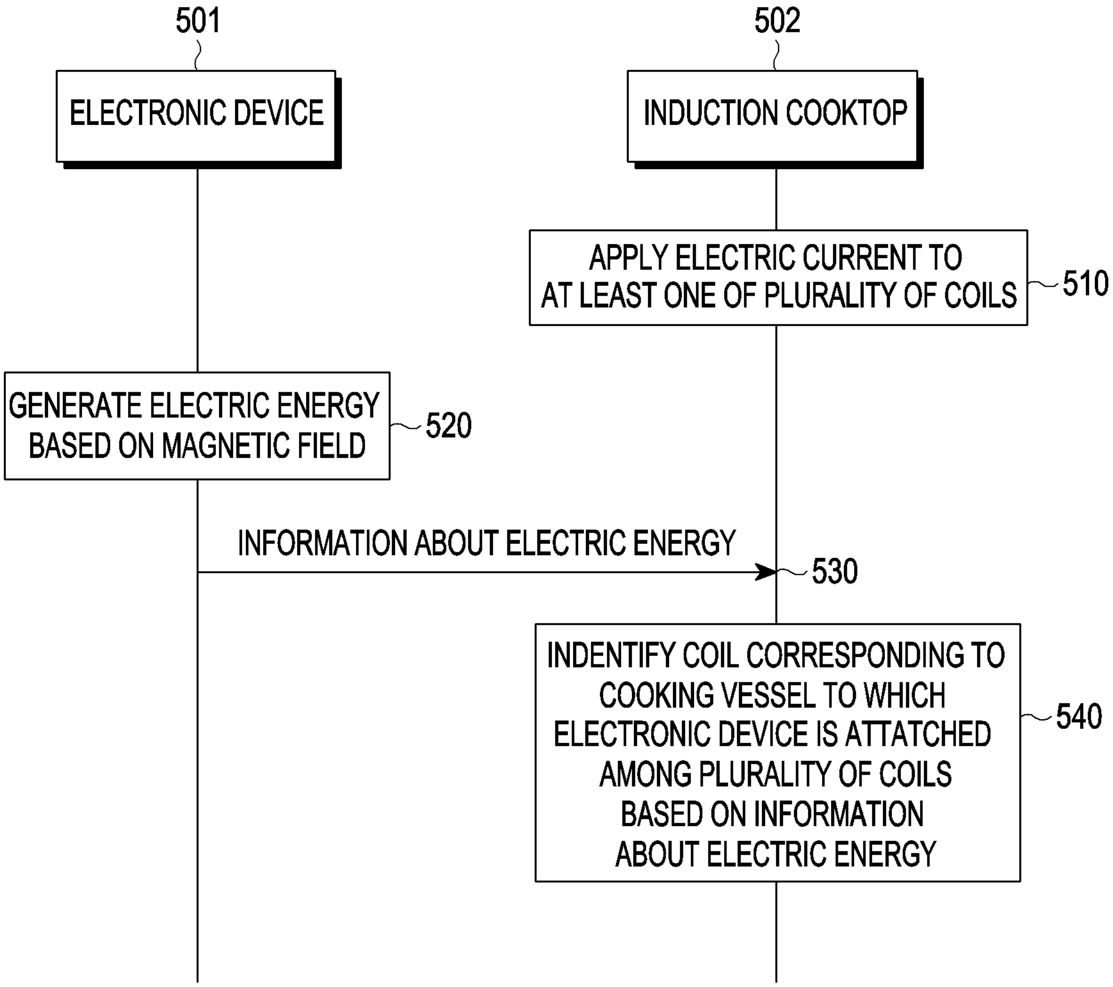
FIG. 5 is a signal flow diagram illustrating example operations of the electronic device and the induction cooktop according to various embodiments.

FIG. 5 is a signal flow diagram illustrating example operations of an electronic device 501 and an induction cooktop 502 according to various embodiments. In process 510, a processor (e.g., the processor 310) of an induction cooktop 502 (e.g., the induction cooktop 300) may apply an electric current to at least one of a plurality of coils (e.g., the coil 331, the coil 332, and the coil 333). According to various embodiments, the processor 310 may apply an AC current to the at least one coil. According to various embodiments, the processor 310 may check to which of the plurality of coils 331, 332, and 333 an electric current is applied based on an input from an outside (e.g., a user) of the induction cooktop 502, and an intensity of the applied electric current. For example, the processor 310 may apply an electric current to a specific coil of the plurality of coils 331, 332, and 333 which is set by a user through the input unit of the induction cooktop 502 according to an output level set by the user.

According to various embodiments, in the case where the processor 310 of the induction cooktop 502 applies an electric current to two or more of the plurality of coils 331, 332, and 333, the processor 310 may apply an AC current in which at least one of a frequency or a duty cycle is different to each coil.

In process 510, as the electric current is applied to at least one of the plurality of coils 331, 332, and 333, a magnetic field may be formed around the coil to which the electric current is applied. In the case where the electric current applied to the at least one coil is an AC current, a magnitude of the magnetic field around the coil may also vary over time.

In process 520, an electronic device 501 (e.g., the electronic device 210) may generate electric energy based on the magnetic field formed around the at least one coil of the induction cooktop 502. According to various embodiments, the electronic device 501 may generate electric energy through the magnetic harvester circuit 220.

In process 530, the electronic device 501 (e.g., the electronic device 210) may transmit information about the generated electric energy to the induction cooktop 502. According to various embodiments, the electronic device 501 may include a processor, and the processor may identify the information about the electric energy based on the electric energy generated through the magnetic harvester circuit 220. According to various embodiments, the information about the electric energy may include, for example, and without limitation, at least one of a magnitude, frequency, duty cycle of AC power, or the like. According to various embodiments, the processor of the electronic device 501 may transmit the information about the electric energy to the induction cooktop 502 through a communication circuit (e.g., the communication circuit 260).

The induction cooktop 502 may receive the information about the electric energy from the electronic device 501 in process 530, and identify the coil corresponding to the cooking vessel to which the electronic device 501 is attached among the plurality of coil (e.g., the coil 331, the coil 332, and the coil 333) based on the received information about the electric energy in process 540. The processor 310 of the induction cooktop 502 (e.g., the induction cooktop 300) may identify the coil to which an electric current corresponding to check the received information about the electric energy is applied among the plurality of coils 331, 332, and 333 as the coil corresponding to the cooking vessel to which the electronic device 501 is attached.

By performing the processes illustrated in FIG. 5, the induction cooktop 502 checks which of the coils is the coil corresponding to the cooking vessel to which the electronic device 501 is attached, and thereby may control a proper coil based on the temperature information received from the electronic device 501.

According to various embodiments, processes 530 and 540 may be periodically performed. For example, the electronic device 501 may periodically transmit the information about the electric energy to the induction cooktop 502, and the induction cooktop 502 may check which of the coils is the coil corresponding to the cooking vessel to which the electronic device 501 is attached by periods based on the information about the electric energy periodically received from the electronic device 501. In this case, even if a position of the cooking vessel to which the electronic device 501 is attached is displaced from one coil to a position corresponding to another coil during cooking, or the electronic device 501 is detached from one cooking vessel and is attached to another cooking vessel during cooking, the induction cooktop 502 continues to keep track of the coil corresponding to the electronic device 501, and thereby may control a proper coil based on the temperature information received from the electronic device 501.

Figure 6:
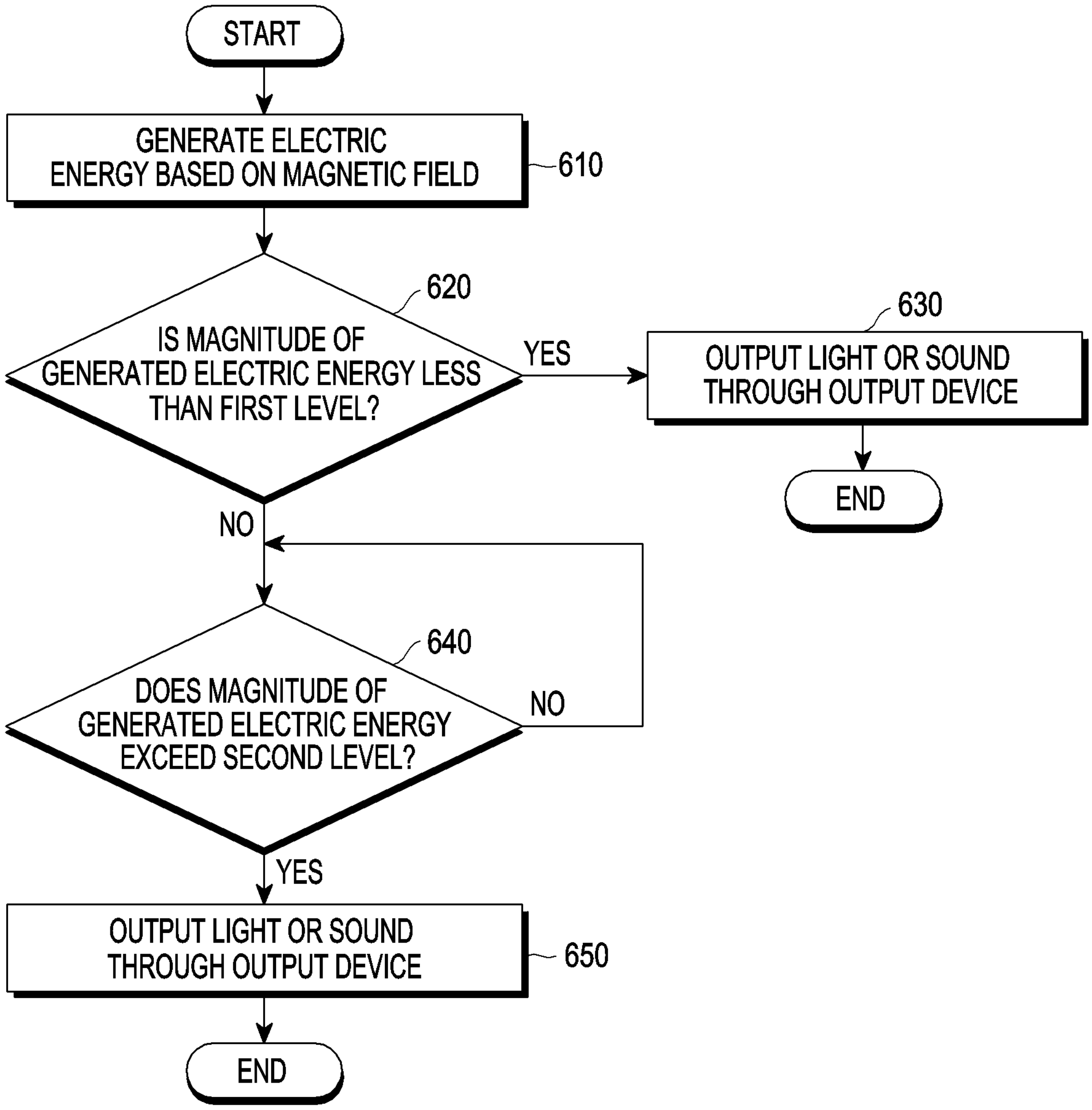
FIG. 6 is a flowchart illustrating an example operation of the electronic device according to various embodiments.

FIG. 6 is a flowchart illustrating an example operation of an electronic device (e.g., the electronic device 210) according to various embodiments.

In process 610, the electronic device 210 may generate electric energy based on a magnetic field generated from an induction cooktop (e.g., the induction cooktop 300). Details of process 520 may be similarly applied to process 610, and thus duplicate description thereof will not be repeated here.

In process 620, a processor of the electronic device (e.g., the electronic device 210) may check whether a magnitude of the generated electric energy is less than a first level. According to various embodiments, the first level may be set to a level to which the electronic device 210 can be driven.

According to another embodiment, the first level may be a predetermined level received from the induction cooktop (e.g., the induction cooktop 300) and corresponds to a current output level of the coil corresponding to the cooking vessel to which the electronic device 210 is attached. In this case, the induction cooktop 300 may include a memory, store a first power level corresponding to the output level of the coil in the memory, and transmit the first power level, which corresponds to the current output level of the coil corresponding to the cooking vessel to which the electronic device 210 is attached, to the electronic device 210.

In the case where it is checked in process 620 that the magnitude of the generated electric energy is less than a first level ("Yes" in operation 620), the processor of the electronic device (e.g., the electronic device 210) may output light or a sound through the output device in process 630. According to various embodiments, in the case where a sound is output through the sound output device, the output sound may represent a message of "move the electronic device to a proper position". According to various embodiments, the display unit may display a message of "move the electronic device to a proper position".

According to various embodiments, in the case where it is checked in process 620 that the magnitude of the generated electric energy is less than a first level, process 630 may performed, otherwise process 630 may not be performed, and the processor of the electronic device (e.g., the electronic device 210) may transmit a signal indicating that the magnitude of the generated electric energy is less than a first level to the induction cooktop 300 or an external electronic device (e.g., a portable communication device) through the communication circuit (e.g., the communication circuit 260). In this case, the induction cooktop 300 may output or display a message of "move the electronic device to a proper position" through the output device (e.g., the output device 340), or output it in a sound form. Further, the external electronic device may output or display a message of "move the electronic device to a proper position" through an application for controlling the induction cooktop and the electronic device 210, or output it in a sound form.

By performing processes 620 and 630, the electronic device 210 is attached to a position at which a magnetic field density is low, or in a direction in which an amount of the generated electric energy is small. In this case, the electronic device 210 may notify a user of the need to move a position of the electronic device 210. Therefore, the user can attach the electronic device 210 to a position at which the electronic device 210 can generate a sufficient amount of electric energy.

According to various embodiments, in the case where it is checked in process 620 that the magnitude of the generated electric energy is more than or equal to a first level ("No" in operation 620), the processor of the electronic device (e.g., the electronic device 210) may check, in process 640, whether the magnitude of the generated electric energy exceeds a second level.

According to various embodiments, the magnitude of the generated electric energy exceeds a second level, which may refer, for example, to the electronic device 210 being located so adjacent to the coil of the induction cooktop (e.g., the induction cooktop 300) that the electronic device 210 has a chance of damage. According to various embodiments, the second level may be higher than the first level of process 620.

According to various embodiments, the second level may be a fixed level that is previously stored in the memory of the electronic device 210. According to another embodiment, the second level may be identified based on information received from the induction cooktop (e.g., the induction cooktop 300). In this case, the induction cooktop 300 may include a memory, store a second power level corresponding to the output level of the coil in the memory, and transmit the second power level, which corresponds to the current output level of the coil corresponding to the cooking vessel to which the electronic device 210 is attached, to the electronic device 210.

In the case where it is checked in process 640 that the magnitude of the generated electric energy does not exceed a second level ("No" in operation 640), the processor of the electronic device (e.g., the electronic device 210) may repeat process 640 until it is determined that the magnitude of the generated electric energy exceeds a second level.

In the case where it is determined in process 640 that the magnitude of the generated electric energy exceeds a second level ("Yes" in operation 640), the processor of the electronic device (e.g., the electronic device 210) may output light or a sound through the output device in process 650. According to various embodiments, in the case where a sound is output through the sound output device, the output sound may represent a message of "move the electronic device to a proper position". According to various embodiments, the display unit may display a message of "move the electronic device to a proper position".

According to various embodiments, the light or the sound output through the output device in process 650 may be different from the light or the sound output through the output device in process 630.

According to various embodiments, process 650 may be performed, otherwise process 650 may not be performed, and the processor of the electronic device (e.g., the electronic device 210) may transmit a signal indicating that the magnitude of the generated electric energy exceeds a second level to the induction cooktop 300 or an external electronic device (e.g., a portable communication device) through the communication circuit (e.g., the communication circuit 260). In this case, the induction cooktop 300 may output display a message of "move the electronic device to a proper position" through the output device (e.g., the output device 340), or output it in a sound form. Further, the external electronic device may output display a message of "move the electronic device to a proper position" through an application for controlling the induction cooktop and the electronic device 210, or output it in a sound form.

By performing processes 640 and 650, in the case where the electronic device 210 is located so adjacent to the coil of the induction cooktop (e.g., the induction cooktop 300) that the electronic device 210 has a chance of damage, the electronic device 210 may notify a user of the need to move a position of the electronic device 210. Therefore, the user can move the electronic device 210 to a position at which damage to the electronic device 210 is not caused.

Unlike the example illustrated in FIG. 6, according to various embodiments, processes 640 and 650 may be omitted. In this case, the electronic device 210 may notify a user to move the electronic device 210 to a proper position in the case where generated energy is excessively little, but the electronic device 210 may not provide notification to a user in the case where generated energy is much.

Further, according to various embodiments, processes 620 and 630 may be omitted. In this case, if the electronic device 210 is located so adjacent to the coil of the induction cooktop (e.g., the induction cooktop 300) that the electronic device 210 has a chance of damage, the electronic device 210 may notify a user to move the electronic device 210 to a proper position, but the electronic device 210 may not provide notification to a user in the case where the energy generated from the electronic device 210 is relatively low.

Figure 7:
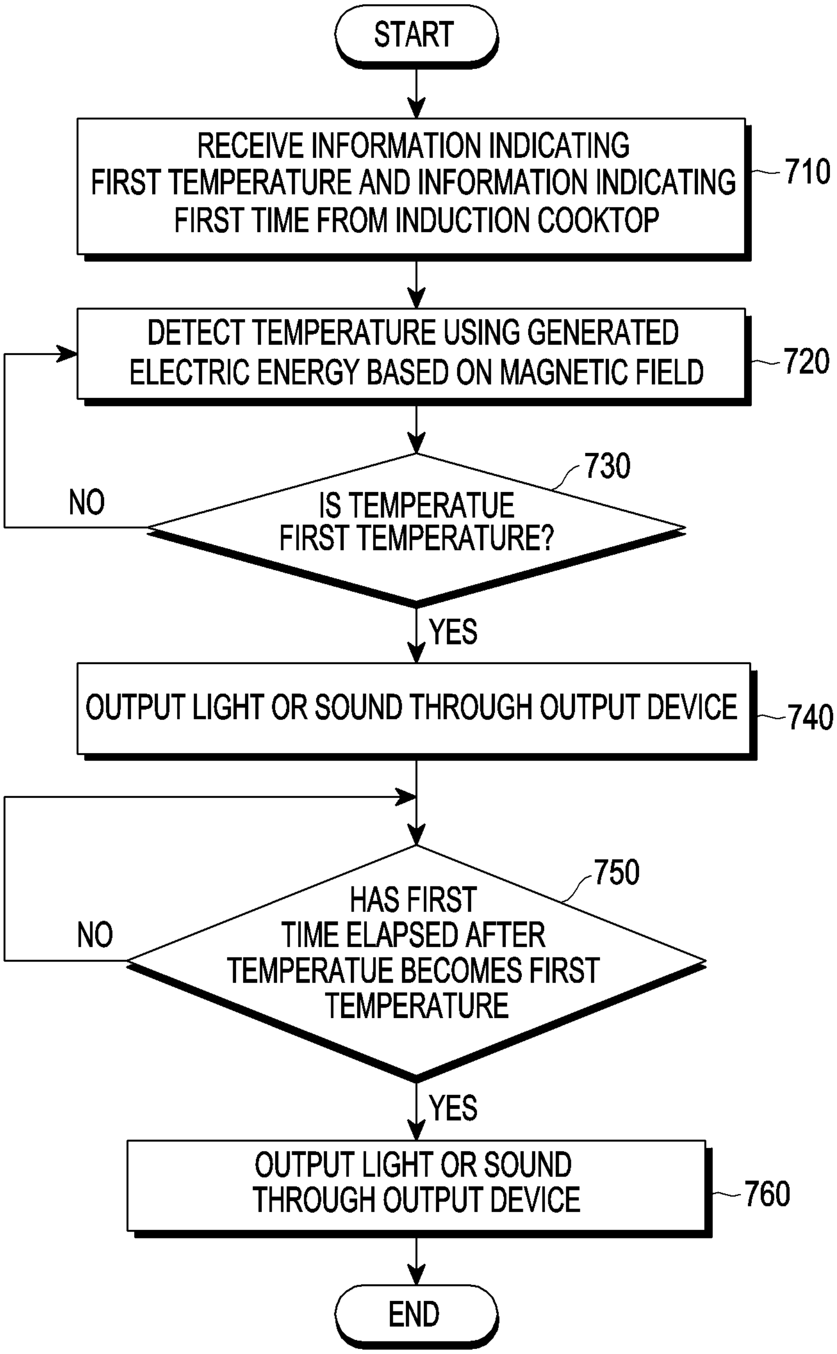
FIG. 7 is a flowchart illustrating an example operation of the electronic device according to various embodiments.

FIG. 7 is a flowchart illustrating an example operation of an electronic device according to various embodiments. In process 710, the processor of the electronic device (e.g., the electronic device 210) may receive information indicating a first temperature and information indicating a first time from the induction cooktop (e.g., the induction cooktop 300) through the communication circuit (e.g., the communication circuit 260).

According to various embodiments, the induction cooktop 300 may identify a first temperature and a first time based on an input from an outside (e.g., a user) through the input unit of the induction cooktop 300, and transmit information indicating the identified first temperature and information indicating the identified first time to the electronic device 210. For example, the induction cooktop 300 may include an input unit that enables a user to set a temperature and a time, and may identify the temperature and the time set by the user as the first temperature and the first time.

In another example, the induction cooktop 300 may support, for example, at least one of a QR code, a bar code, or an RFID, identify a first temperature and a first time included in at least one of input QR code, bar code, or RFID, and transmit information indicating the identified first temperature and information indicating the identified first time to the electronic device 210. For example, at least one of the QR code, the bar code, or the RFID may include a recipe, and the induction cooktop 300 may identify a cooking temperature and a cooking time corresponding to one of heating steps of the recipe as the first temperature and the first time.

In another example, the induction cooktop 300 may communicate with an external electronic device (e.g., a portable communication device), identify a first temperature and a first time based on information received from the external electronic device, and transmit information indicating the first temperature and information indicating the first time to the electronic device 210 based on the identified first temperature and first time. For example, a user of a portable communication device (e.g., a smart phone) may directly input values of the first temperature and the first time through an application for controlling the induction cooktop, or select a recipe. In the case where the user selects the recipe, the external electronic device may identify a cooking temperature and a cooking time corresponding to one of heating steps of the recipe selected by the user as the first temperature and the first time, and transmit information indicating the first temperature and the first time to the induction cooktop 300.

In process 720, the processor of the electronic device (e.g., the electronic device 210) may detect a temperature using the generated electric energy based on the magnetic field generated from the induction cooktop (e.g., the induction cooktop 300). According to various embodiments, the electronic device 210 may drive the temperature sensor 250 based on the electric energy generated using the magnetic harvester circuit 220, and detect a temperature using the temperature sensor 250.

In process 730, the processor of the electronic device (e.g., the electronic device 210) may check whether the temperature detected in process 720 is the first temperature. According to various embodiments, in the case where a difference between the temperature detected in process 720 and the first temperature is less than a fixed level, the processor of the electronic device (e.g., the electronic device 210) may identify the detected temperature as the first temperature.

In the case where it is determined in process 730 that the detected temperature is not the first temperature ("No" in operation 730), the processor of the electronic device (e.g., the electronic device 210) may repeat processes 720 and 730 until it is determined that the detected temperature is the first temperature.

In the case where it is checked in process 730 that the detected temperature is the first temperature ("Yes" in operation 730), the processor of the electronic device (e.g., the electronic device 210) may output light or a sound through the output device in process 740. According to various embodiments, in the case where the sound is output through the sound output device, the output sound may represent a message of "input materials to be cooked". According to various embodiments, the display unit may display a message of "input materials to be cooked".

By performing processes 710 to 740, when a temperature of the cooking vessel reaches a temperature suitable to cook materials, the electronic device 210 may notify a user of that, and thereby help the user to input materials to be cooked in good time.

In process 750, the processor of the electronic device (e.g., the electronic device 210) may check whether the first time has elapsed after the temperature becomes the first temperature. In the case where the first time has not elapsed after the temperature becomes the first temperature ("No" in operation 750), the processor of the electronic device (e.g., the electronic device 210) may repetitively perform process 750 until it is checked that the first time has elapsed.

In the case where it is determined that the first time has elapsed after the temperature becomes the first temperature ("Yes" in operation 750), the processor of the electronic device (e.g., the electronic device 210) may output light or a sound through the output device in process 760. According to various embodiments, in the case where the sound is output through the sound output device, the output sound may represent a message of "the cooking step is done". According to various embodiments, display unit may display a message of "the cooking step is done".

By performing processes 740 to 760, when a proper cooking time has elapsed at a specific temperature, the electronic device 210 may notify a user of that, and thereby help the user to complete the cooking in good time.

According to various embodiments, process 760 is performed, or in place of process 760, the processor of the electronic device (e.g., the electronic device 210) may stop applying an electric current to the coil corresponding to the position of the cooking vessel to which the electronic device 210 is attached.

Further, although not illustrated in FIG. 7, according to various embodiments, processes 730 and 740 may be omitted. In this case, the processor of the electronic device (e.g., the electronic device 210) may function as a timer that outputs light or a sound through the output device when a fixed time has elapsed. The induction cooktop 300 may control an electric current of the coil corresponding to the position of the cooking vessel to which the electronic device 210 is attached such that a temperature when a timer starts to be driven is maintained until the driving of the timer is completed.

Further, although not illustrated in FIG. 7, according to various embodiments, processes 750 and 760 may be omitted. In this case, the processor of the electronic device (e.g., the electronic device 210) may not receive information indicating the first time in process 710.

According to various example embodiments, an electronic device attachable to and detachable from a side of a cooking vessel heated based on a magnetic field generated from an induction cooktop may include: a magnetic harvester circuit configured to generate electric energy based on the magnetic field generated from the induction cooktop based on the electronic device being attached to the side of the cooking vessel, a temperature sensor configured to be driven based on the electric energy and configured to detect a temperature, and a communication circuit configured to transmit the temperature to the induction cooktop.

According to various example embodiments, the electronic device may further include a processor, and the processor may be configured to transmit information about the electric energy generated by the magnetic harvester circuit to the induction cooktop through the communication circuit.

According to various example embodiments, the information about the electric energy may indicate at least one of a magnitude, frequency, or duty cycle of AC power based on the electric energy.

According to various example embodiments, the processor may be configured to periodically transmit information about the electric energy to the induction cooktop through the communication circuit.

According to various example embodiments, the electronic device may further include an output device comprising output circuitry and a processor. The processor may be configured to output light or a sound through the output device based on a magnitude of the electric energy generated by the magnetic harvester circuit being less than a first level.

According to various example embodiments, the processor may be configured to output the light or the sound through the output device based on the magnitude of the electric energy generated by the magnetic harvester circuit exceeding a second level, the second level being higher than the first level.

According to various example embodiments, the electronic device may further include a display unit comprising a display and a processor. The processor may be configured to control an output of the display unit based on the temperature.

According to various example embodiments, the electronic device may further include an output device comprising output circuitry and a processor. The processor may be configured to receive information indicating a first temperature from the induction cooktop through the communication circuit, and to output light or a sound through the output device based on the temperature detected from the temperature sensor being the first temperature.

According to various example embodiments, the processor may be configured to receive information indicating a first time from the induction cooktop through the communication circuit, and to output light or a sound through the output device based on the first time elapsing after the temperature detected from the temperature sensor becomes the first temperature.

According to various example embodiments, the electronic device may further include a magnet attachable to the cooking vessel.

According to various example embodiments, the electronic device may further include a rectifier circuit configured to convert AC power based on the electric energy generated by the magnetic harvester circuit into first DC power, and a DC/DC converter configured to convert the first DC power into second DC power for driving the temperature sensor and the communication circuit.

According to various example embodiments, an induction cooktop may include: a plurality of coils, a communication circuit, and a processor. The processor may be configured to receive, through the communication circuit, information indicating a temperature from an electronic device, attachable to a side of a cooking vessel configured to be placed on the induction cooktop, the induction cooktop being configured to apply an electric current to at least one of the plurality of coils, the electronic device including a magnetic harvester circuit configured to produce electric energy based on a magnetic field generated based on the electric current applied to at least one of the plurality of coils, the induction cooktop configured to control the electric current based on the information indicating the temperature.

According to various example embodiments, the processor may be configured to receive information about the electric energy generated by the magnetic harvester circuit from the electronic device through the communication circuit, and to identify one of the plurality of corresponding to the cooking vessel to which the electronic device is attached based on the information about the electric energy.

According to various example embodiments, the information about the electric energy may indicate at least one of a magnitude, frequency, or duty cycle of AC power based on the electric energy.

According to various example embodiments, the processor may be configured to apply a first electric current to a first coil of the plurality of coils, and to apply a second electric current to a second coil. A frequency or a duty cycle of the first electric current may be different from that of the second electric current.

According to various example embodiments, the induction cooktop may further include a display unit comprising a display, and the processor may be configured to control an output of the display unit based on the information indicating the temperature.

According to various example embodiments, the induction cooktop may further include an output device comprising output circuitry, and the processor may be configured to transmit information indicating the first temperature to the electronic device through the communication circuit, and to output light or a sound through the output device based on the information indicating the temperature being received from the electronic device through the communication circuit, indicates the first temperature.

According to various example embodiments, the processor may be configured to output the light or the sound through the output device based on a first time elapsing after the information indicating the first temperature is received from the electronic device through the communication circuit.

According to various example embodiments, a method of operating an electronic device that is attachable to and detachable from a side of a cooking vessel that is heated based on a magnetic field generated from an induction cooktop may include: producing electric energy based on the magnetic field generated from the induction cooktop based on the electronic device being attached to the side of the cooking vessel, driving a temperature sensor configured to detect a temperature based on the electric energy, and transmitting the temperature to the induction cooktop.

According to various example embodiments, the method may further include transmitting at least one of a magnitude, frequency, or duty cycle of AC power based on the electric energy to the induction cooktop.

It should be appreciated that various example embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

Various embodiments as set forth herein may be implemented as software (e.g., program) including one or more instructions that are stored in a storage medium (e.g., internal memory or external memory) that is readable by a machine (e.g., electronic device). For example, a processor of the machine (e.g., electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code made by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents.

What is claimed is:

1. An electronic device attachable to and detachable from a side of a cooking vessel configured to be heated based on a magnetic field generated from an induction cooktop, the electronic device comprising:

a magnetic harvester circuit configured to generate electric energy based on the magnetic field generated by a coil among a plurality of coils of the induction cooktop based on the electronic device being attached to the side of the cooking vessel;

a temperature sensor configured to be driven based on the generated electric energy and to detect a temperature; and a communication circuit configured to transmit, to the induction cooktop, information indicating the temperature and information about the generated electric energy including frequency and duty cycle of AC power for identifying the coil generating the magnetic field among the plurality of coils of the induction cooktop.

2. The electronic device of claim 1, further comprising processing circuitry, wherein the processing circuitry is configured to transmit the information about the electric energy generated by the magnetic harvester circuit to the induction cooktop through the communication circuit.

3. The electronic device of claim 1, further comprising:

internal circuitry comprising the communication circuit and a processing circuitry configured to control the communication circuity; and a shield disposed between the magnetic harvester circuit and at least a portion of the internal circuitry, wherein the magnetic harvester circuit is disposed between the temperature sensor and the internal circuitry.

4. The electronic device of claim 2, wherein the processing circuitry is configured to periodically transmit the information about the electric energy to the induction cooktop through the communication circuit.

5. The electronic device of claim 1, further comprising an output device comprising output circuitry and processing circuitry, wherein the processing circuitry is configured to output light or a sound through the output device based on a magnitude of the electric energy generated by the magnetic harvester circuit being less than a first level.

6. The electronic device of claim 5, wherein the processing circuitry is configured to output the light or the sound through the output device based on the magnitude of the electric energy generated by the magnetic harvester circuit exceeding a second level, the second level being higher than the first level.

7. The electronic device of claim 1, further comprising a display unit including a display and processing circuitry, wherein the processing circuitry is configured to control an output of the display unit based on the temperature.

8. The electronic device of claim 1, further comprising an output device comprising output circuitry and processing circuitry, wherein the processing circuitry is configured to:

receive information indicating a first temperature from the induction cooktop through the communication circuit; and output light or a sound through the output device based on the temperature detected from the temperature sensor being the first temperature.

9. The electronic device of claim 8, wherein the processing circuitry is configured to:

receive information indicating a first time from the induction cooktop through the communication circuit; and output light or a sound through the output device based on the first time elapsing after the temperature detected from the temperature sensor becomes the first temperature.

10. The electronic device of claim 1, further comprising a magnet attachable to the cooking vessel.

11. The electronic device of claim 1, further comprising:

a rectifier circuit configured to convert AC power based on the electric energy generated by the magnetic harvester circuit into first DC power; and a DC/DC converter configured to convert the first DC power into second DC power to drive the temperature sensor and the communication circuit.

12. An induction cooktop comprising:

a plurality of coils;

a communication circuit; and processing circuitry, wherein the processing circuitry is configured to:

control supply of electric current to at least two of the plurality of coils simultaneously, wherein the plurality of coils are configured to generate magnetic field based on the supplied electric current;

during the supply of the electric current simultaneously to the at least two of the plurality of coils, receive, through the communication circuit from an electronic device attachable to a side of a cooking vessel configured to be placed on a coil of the at least two of the plurality of coils to which the electrical current is supplied, the electronic device including a magnetic harvester circuit configured to produce electric energy based on a magnetic field generated based on the electric current applied by the induction cooktop to the coil of the at least two of the plurality of coils on which the cooking vessel is placed, information indicating a temperature and information about the produced electric energy including frequency and duty cycle of AC power;

identify the coil of the at least two of the plurality of coils on which the cooking vessel including the electronic device is placed based on the received information about the produced electric energy including the frequency and the duty cycle of AC power; and control the electric current supplied to the identified coil based on the received information indicating the temperature.

13. The induction cooktop of claim 12, wherein the simultaneous supply of electric current to each of the plurality of coils includes supplying AC current in which at least one of a frequency or a duty cycle is different in each of the plurality of coils.

14. The induction cooktop of claim 12, wherein the information about the electric energy indicates a magnitude of AC power based on the electric energy.

15. The induction cooktop of claim 12, wherein:

the processing circuitry is configured to simultaneously apply a first electric current to a first coil of the plurality of coils and to apply a second electric current to a second coil; and a frequency or a duty cycle of the first electric current is different from a frequency or duty cycle of the second electric current.

16. The induction cooktop of claim 12, further comprising a display unit including a display, wherein the processing circuitry is configured to control an output of the display unit based on the information indicating the temperature.

17. The induction cooktop of claim 12, further comprising an output device including output circuitry, wherein the processing circuitry is configured to:

transmit information indicating a first temperature to the electronic device through the communication circuit; and output light or a sound through the output device based on the information indicating the temperature being received from the electronic device through the communication circuit, indicates the first temperature.

18. The induction cooktop of claim 17, wherein the processing circuitry is configured to output the light or the sound through the output device based on a first time elapsing after the information indicating the first temperature is received from the electronic device through the communication circuit.

19. A method of operating an electronic device attachable to and detachable from a side of a cooking vessel configured to be heated based on a magnetic field generated by a coil among a plurality of coils of an induction cooktop, the method comprising:

producing, using a magnetic harvester circuit, electric energy based on the magnetic field generated by the coil of the induction cooktop based on the electronic device being attached to the side of the cooking vessel;

driving a temperature sensor configured to detect a temperature based on the produced electric energy; and transmitting, to the induction cooktop, information indicating the temperature and information about the produced electric energy including frequency and duty cycle of AC power for identifying the coil generating the magnetic field among the plurality of coils of the induction cooktop.

20. The method of claim 19, further comprising outputting light or a sound through an output device of the electronic device based on a magnitude of the produced electric energy.

* * * * *